US006251147B1

(12) United States Patent
Peterson et al.

(10) Patent No.: US 6,251,147 B1
(45) Date of Patent: Jun. 26, 2001

(54) ARTIFICAL FIRELOG AND FIRESTARTER CHIP PRODUCING APPARATUS AND METHOD AND PRODUCTS PRODUCED THEREFROM

(76) Inventors: Gregory J. Peterson, 9925 Logan Rd., Redding, CA (US) 96003; Gary M. Flint, 920 St. Clair Dr., Chico, CA (US) 95973

(*) Notice: Subject to any disclaimer, the term of this patent is extended or adjusted under 35 U.S.C. 154(b) by 0 days.

(21) Appl. No.: 09/165,270

(22) Filed: Oct. 1, 1998

(51) Int. Cl.[7] .............................. C10L 11/04; C10L 11/08
(52) U.S. Cl. ........................ 44/576; 44/535; 44/590; 44/595; 44/596; 44/606
(58) Field of Search .................... 44/535, 576, 590, 44/595, 596, 606

(56) References Cited

U.S. PATENT DOCUMENTS

| 930,526 | 8/1909 | Bloss | 44/521 |
|---|---|---|---|
| 1,191,458 | 7/1916 | Phillips | 44/532 |
| 3,010,809 | 11/1961 | Peck | 44/520 |
| 3,367,757 | 2/1968 | Church | 44/522 |
| 3,986,845 | 10/1976 | Hotchkiss | 44/636 |
| 4,043,765 | 8/1977 | Tanner | 44/519 |
| 4,120,666 | 10/1978 | Lange . | |
| 4,243,394 | 1/1981 | Kincaid | 44/521 |
| 4,539,011 | 9/1985 | Kretzschmann | 44/270 |
| 4,623,324 | 11/1986 | Zulkowitz | 44/522 |
| 4,762,525 | 8/1988 | Wood | 44/534 |
| 5,197,659 | 3/1993 | Vassiliou | 229/117.01 |
| 5,496,384 | 3/1996 | Jeskey et al. | 44/535 |
| 5,580,360 | 12/1996 | Pool | 44/535 |
| 5,830,245 | * 11/1998 | Raddon | 44/544 |
| 5,868,804 | * 2/1999 | Williams et al. | 44/535 |

FOREIGN PATENT DOCUMENTS

| 401 525 | 9/1996 | (AT) . |
|---|---|---|
| 2114670 | 8/1995 | (CA) . |
| 35 10969 A1 | 1/1986 | (DE) . |
| WO 94/07688 | 4/1994 | (WO) . |

* cited by examiner

Primary Examiner—Jerry D. Johnson
(74) Attorney, Agent, or Firm—John P. O'Banion

(57) ABSTRACT

An artificial firelog and firestarter chip producing apparatus comprising a cutting assembly, a compression conveyor auger assembly and a die. The apparatus converts standard waxed corrugated cardboard boxes into artificial firelogs by first slicing cardboard sheets into cardboard strips, then chopping the cardboard strips into cardboard segments in the cutting assembly. The cardboard segments are compressed and in the compression conveyor auger assembly and extruded in the die to form generally circular, longitudinally-shaped sections of a firelog. Firestarter chips are fabricated by the cutting assembly, which slices cardboard sheets in conjunction with paper sheets into cardboard and paper strips, then chopping the cardboard strips into cardboard segments and the paper strips into paper mix.

2 Claims, 20 Drawing Sheets

ARTIFICAL FIRELOG AND FIRESTARTER CHIP PRODUCING APPARATUS AND METHOD AND PRODUCTS PRODUCED THEREFROM

BACKGROUND OF THE INVENTION

1. Field of the Invention

The present invention pertains generally to a fuel manufacturing apparatus, and more particularly to an apparatus for converting flammable material, such as waxed cardboard, into compact artificial firelogs or firestarter chips.

2. Description of the Background Art

The popularity of log burning fireplaces as an amenity and as a supplemental source of heat continues to grow. With cutting restrictions on Government land, as well as the closing of many wood processing plants, wood logs can be difficult and expensive to obtain. As a result, artificial firelogs have been gaining in popularity.

Boxes and containers made from cardboard are widely used in an almost infinite variety of applications such as packaging, shipping and storage of goods and the like. As such, there is an abundant supply of discarded cardboard boxes readily available for recycling. It has been recognized that discarded cardboard boxes form a potential fuel material, and the general concept of converting used or discarded cardboard boxes into burnable firelogs has been applied with some level of success.

Machines have been developed to convert such cardboard boxes into compact burnable firelogs. Such machines include a feed system, such as a hammermill, for receiving a sheet of cardboard into the cutting system, a cutting mechanism for slicing the cardboard sheet into strips and then cutting the strips into chips and a compacting/compressing using a punch press assembly for shaping the chips into compact firelog structures which can be burned in a fireplace. Binders, such as glue, are used to hold the chips together after compression. Additionally, the finished firelogs can be dipped into wax for a outer wax coating to enhance their burn capability. These machines are, however, designed to cut and shape plain cardboard boxes, i.e. without a wax or like coating thereon.

There exists a problem relating to recycling certain types of cardboard boxes. Wax-coated corrugated cardboard boxes, which are commonly coated with a paraffin-based wax, are generally non-recyclable because, in normal re-pulping systems, the wax is very expensive to separate from the corrugated cardboard efficiently. Thus, used wax-coated corrugated cardboard boxes are usually discarded in landfills. In view of present interests regarding conservation of resources and environmental consciousness, the ability to reuse such discarded material in a form of fuel would serve to reduce the demand for other types of fuels, such as oil, gas or coal, thus further conserving natural resources and preserving the environment.

Additionally, these machines destroy the corrugation within the cardboard, preventing the flow and permeation of wax and oxygen through the firelog, resulting in an incomplete and inefficient burning of the firelog. Moreover, such machines produce firelogs having "cold joints" at the intervals between punches or presses. Cold joint are weak links within the firelog that are easily separated when any shear or tensile force is exerted thereon, resulting in multiple sections of broken firelogs.

Accordingly, there exists a need for an artificial firelog manufacturing apparatus that provides the capability to recycle pre-waxed corrugated cardboard boxes into firelogs that are more structurally rigid and that burn more efficiently over that presently known in the art. The present invention satisfies those needs, as well as others, and overcomes the deficiencies found currently known artificial firelog producing machines.

BRIEF SUMMARY OF THE INVENTION

The present invention is an apparatus which converts standard corrugated cardboard sheets into artificial firelogs or firestarter chips. The invention produces artificial firelogs or firestarter chips by first slicing cardboard sheets into cardboard strips, then cutting the cardboard strips into cardboard segments. The cardboard segments for the artificial firelogs are compressed and shaped into generally circular, longitudinally-shaped pieces resembling a firelog. The apparatus is even capable of processing pre-waxed cardboard into artificial firelogs and firestarter.

By way of example and not of limitation, the artificial firelog producing apparatus of the present invention generally comprises a plurality of upper circular blades juxtaposed axially, a plurality of lower circular blades juxtaposed axially such that the cutting edge of the upper circular blades overlap the cutting edge of the lower circular blades, a cutting reel disposed beneath the lower circular blade, a conveyor compression auger positioned adjacent the cutting reel and a log die. The upper and lower circular blades effectively slice a waxed cardboard sheet fed therein into waxed cardboard strips. The waxed cardboard strips are then fed through the cutting reel which cuts the cardboard strips into waxed cardboard segments. The waxed cardboard segments are fed into the conveyor compression auger for transport into a log die. While the conveyor compression auger transports the waxed cardboard segments, the segments are gradually compressed and forced into the log die. The log die shapes the waxed cardboard segments into artificial firelogs.

Use of a conveyor compression auger results in a significant improvement over punch press-type machines because the conveyor compression auger horizontally (based on the longitudinal axis of the firelog) flattens the waxed cardboard segments, as opposed to vertically flattening or crushing the cardboard segments. The result is a firelog that burns similar to genuine wood bark. The conveyor compression auger also eliminates cold joints in the firelog, eliminating the likelihood of the firelog breaking into segments on the grate.

An object of the invention is to provide an apparatus capable of processing pre-waxed cardboard to produce artificial firelogs.

Another object of the invention is to provide an apparatus capable of producing artificial firelogs more efficiently than other firelog producing machines presently known or available.

Still another object of the invention is to provide an apparatus capable of reliably feeding, slicing and cutting waxed cardboard sheets and paper sheets into waxed cardboard segments and paper segments.

Still another object of the invention is to provide an apparatus capable of producing artificial firelogs without adding glue or wax.

Still another object of the invention is to provide an apparatus that produces firelogs without cold joints.

Still another object of the invention is to provide an apparatus which uses a screw compression auger to transport and compress waxed cardboard segments into artificial firelogs.

Still another object of the invention is to provide an apparatus which is capable of producing firestarter chips.

Still another object of the invention is to provide an apparatus which is capable of producing firestarter blends of different materials.

Still another object of the invention is to provide an apparatus capable of producing a log having a outer covering which can be used as a post.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
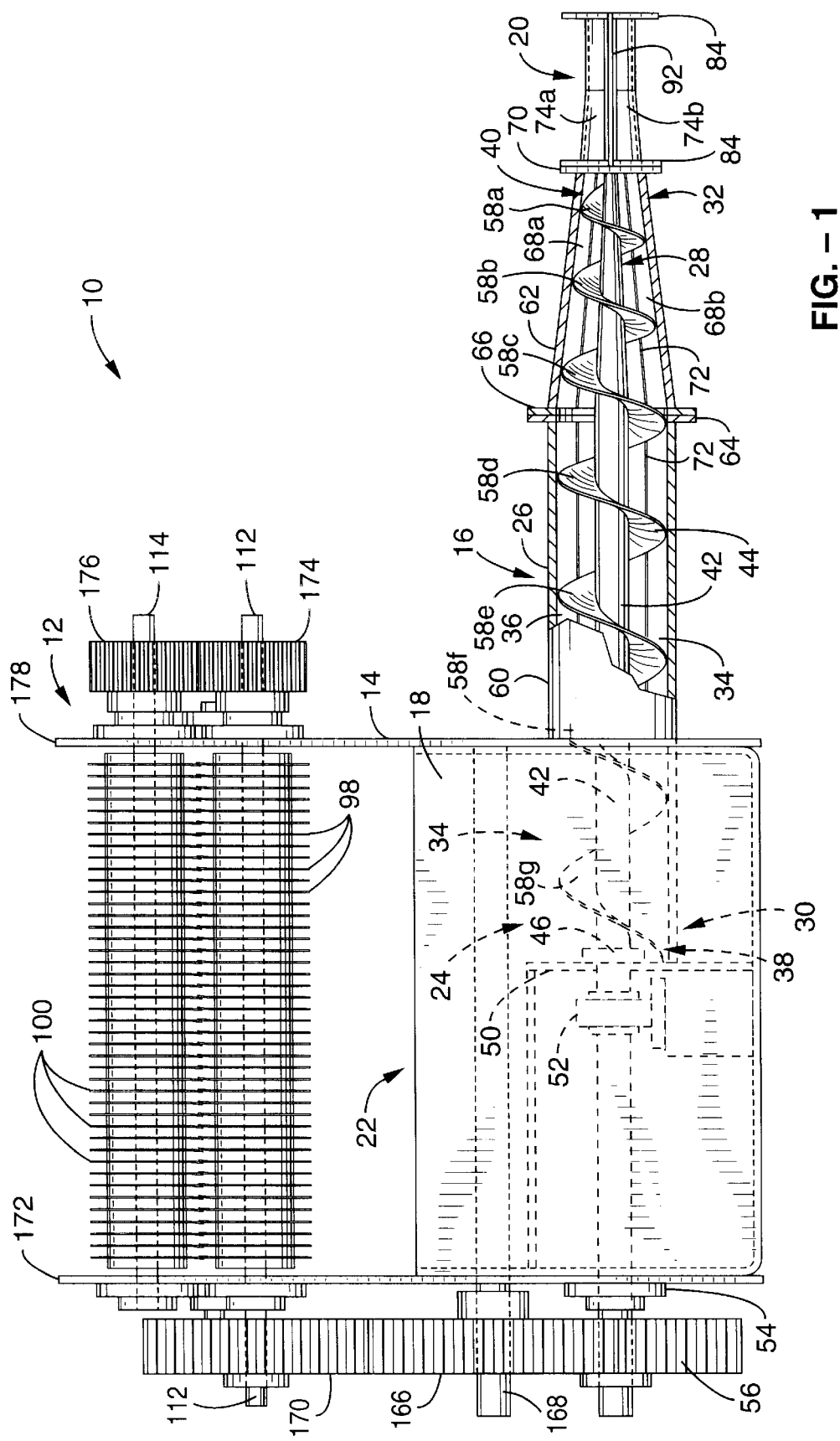
FIG. 1 is a front sectional view of an artificial firelog producing apparatus of the present invention.

Referring more specifically to the drawings, for illustrative purposes the present invention is embodied in the apparatus generally shown in FIG. 1 through FIG. 25, wherein like reference numerals denote like parts. It will be appreciated that the apparatus may vary as to configuration and as to details of the parts without departing from the basic concepts as disclosed herein.

Figure 2:
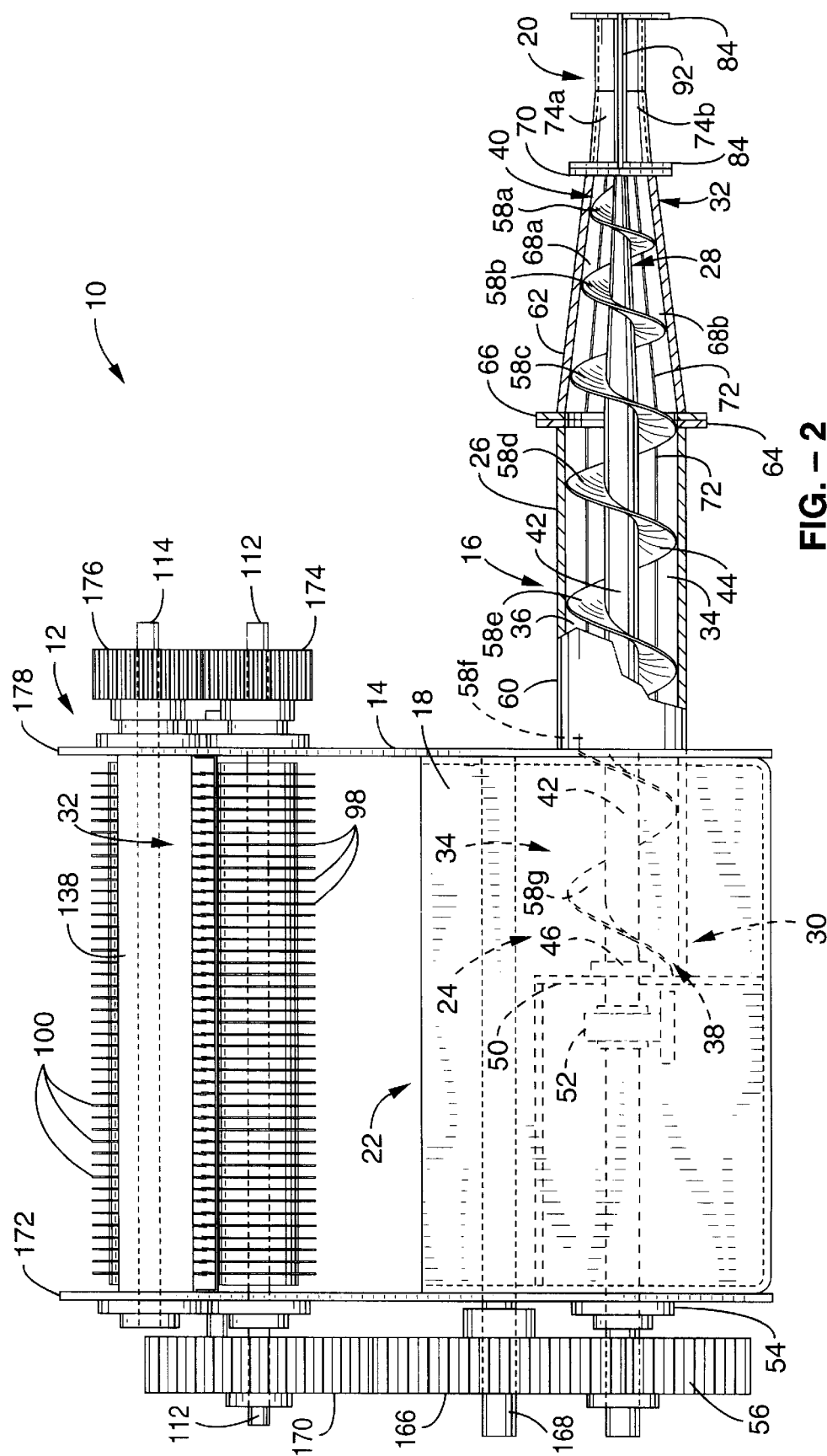
FIG. 2 is a front sectional view of the artificial firelog producing apparatus shown in FIG. 1.
Figure 3:
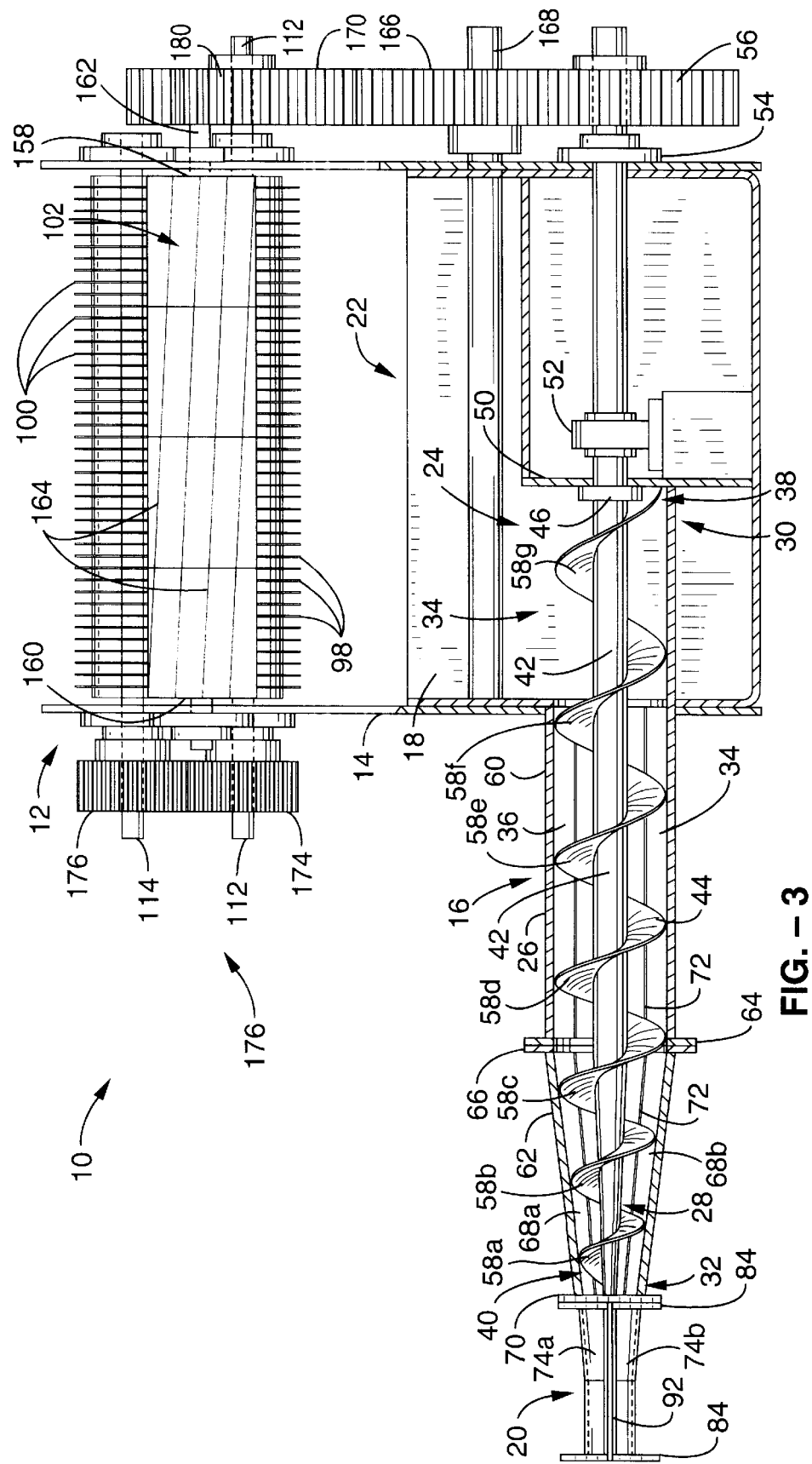
FIG. 3 is a rear view of the artificial firelog producing apparatus shown in FIG. 1.
Figure 4:
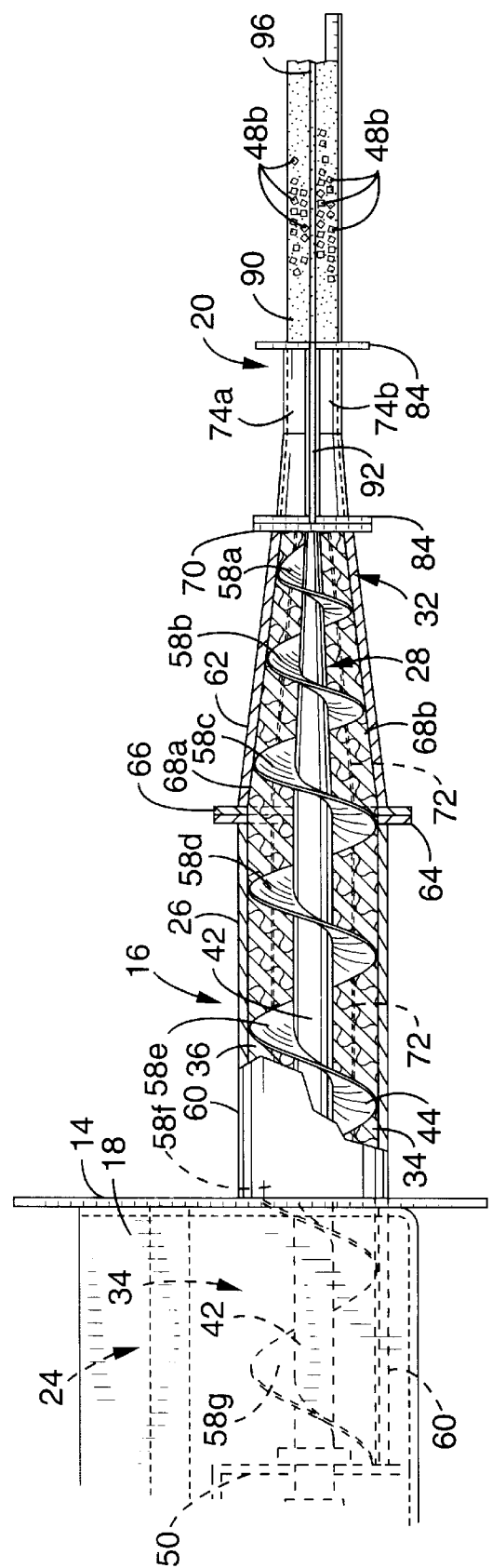
FIG. 4 is a front sectional view of an conveyor compression auger assembly and firelog die of the present invention.
Figure 5:
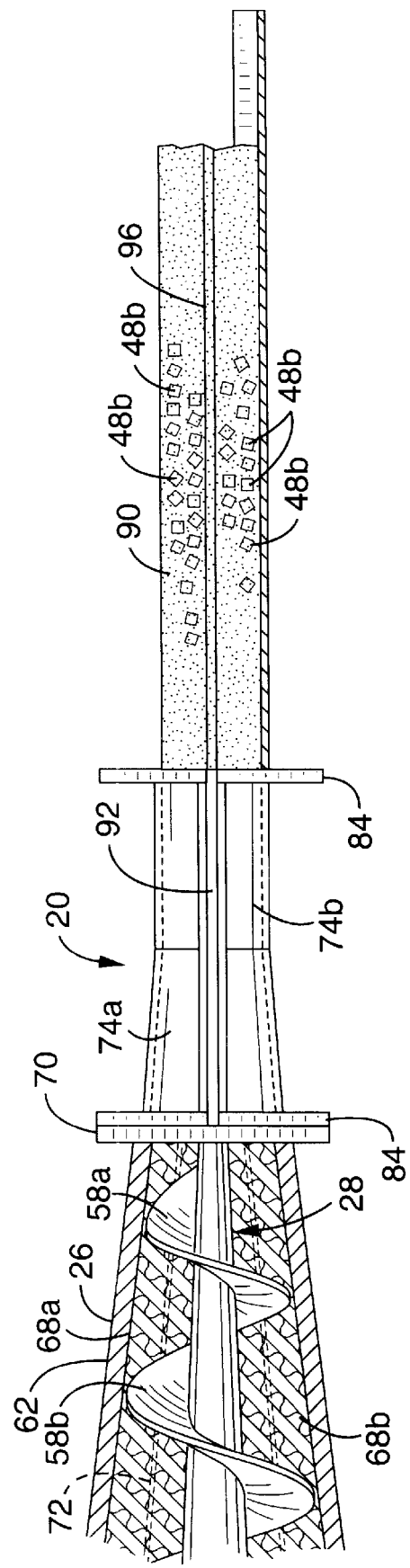
FIG. 5 is a detailed front sectional view of the conveyor compression auger assembly and firelog die shown in FIG. 4.

Referring first to FIG. 1 through FIG. 3, an artificial firelog manufacturing apparatus 10 of the present invention is generally shown. Apparatus 10 generally comprises a cardboard sheet cutting assembly 12, an enclosure 14, a compression auger conveyor assembly 16, a hopper 18 and a firelog die 20. Cardboard sheet cutting assembly 12 is positioned on enclosure 14 above hopper 18. Hopper 18 is disposed within enclosure 14 and includes an upper opening 22 and a discharge chute 24. Discharge chute 24 is positioned adjacent auger conveyor assembly 16 so that materials exiting from discharge chute 24 will be fed into auger conveyor assembly 16.

Conveyor compression auger assembly 16 is a compression type which comprises a housing 26 and a conveyor compression screw 28. Housing 26 is generally tubular and includes an inlet end 30 and an outlet end 32. Outlet end 32 of housing 26 is tapered or conical, and an opening 34, which is in communication with hopper 18, is disposed adjacent inlet end 30 of housing 26. A bore or circular passageway 36 is disposed longitudinally within housing 26.

Conveyor compression screw 28 has a first end 38 and a second end 40 and includes a shaft 42 rotatably disposed within circular passageway 36 of housing 26. First end 38 of conveyor compression screw 28 is adjacent inlet end 30 of housing 26 and second end 40 of conveyor compression screw 28 is adjacent outlet end 32 of housing 26. Shaft 42 incorporates a helical screw 44 between inlet end 30 and outlet end 32 of housing 26.

Shaft 42 is approximately 84-inches long and extends through enclosure 14, inlet end 30 of housing 26 and terminating adjacent outlet end 32 of housing 26. A thrust bearing 46 is welded onto shaft 42 adjacent inlet end 30 of housing 26. Thrust bearing 46 absorbs the axial loads generated by conveyor compression screw 28, as conveyor compression screw 28 transports cardboard segments 48a (shown in FIG. 16) therethrough, by rotating against a support plate 50 located within enclosure 14. Shaft 42 is rotatably disposed within a pillar block bearing 52 located within enclosure 14 and a flange bearing 54 located at opening (not shown) of enclosure 14 where shaft 42 extends therethrough. Pillar block bearing 52 and flange bearing 54 help maintain the radial loads generated by shaft 42 during rotation. Shaft 42 typically has an approximate diameter of 2 7/16 inches for the first 24 inches of its length, beginning at the end adjacent flange bearing 54 through to thrust bearing 46. Shaft diameter increases to approximately 2¹⁵⁄₁₆ inches from thrust bearing 46 for the next 42-inches of its length. The diameter of shaft 42 then tapers down to approximately 1-inch for the last 18-inches of its length, terminating adjacent outlet end 32 of housing 26. There is a 6-inch standard keyway (not shown) beginning at the end of shaft 42 adjacent flange bearing 54. Located around shaft 42 and keyway are a nut (not shown), lockwasher (not shown) and spur gear 56.

Helical screw 44 begins adjacent second end 40 of conveyor screw 28 and includes 7 flights 58a–58g through to first end 38 of conveyor screw 28. Measuring from crest-to-crest, flights 58a–58g are spaced apart, from second end 40 to first end 38 of conveyor screw 28, in the following respective approximate proportions: 5½ inches, 7¼ inches, 7¾ inches, 9-inches, 10-inches and 11-inches. Flight 58a has a maximum diameter of about 4-inches at second end 40 of conveyor compression screw 28 and increases to about 7½ inches in the first three flights 58a, 58b, 58c, and remains constant through flights 58d–58g.

Referring also to FIG. 4 through FIG. 7, housing 26 comprises a tubular section 60 and a conical section 62. Tubular section 60 typically has an inner diameter of approximately 8-inches and an outer diameter of approximately 8½ inches. Beginning at support plate 50, tubular section 60 is semi-circular at the lower portion for approximately 15-inches. The upper portion provides for opening 34 to access conveyor compression screw 28. Tubular section 60 is circular for approximately the next 28-inches and includes a 2-inch circular bolt flange 64. Cone section 62 is tapered and begins with a 2-inch circular bolt flange 66 mated with 2-inch circular bolt flange 64 of tubular section 60. Cone section 62 begins with an approximate inner diameter of 8-inches and ends with an approximate inner diameter of 4½ inches. The taper of cone section 62 is preferably between approximately 5° and 7.5°. Cone section 62 is formed by a pair of upper and lower semi-spherical sections 68a, 68b. When upper and lower semi-spherical sections 68a, 68b are place together, cone section 62 is formed and when cone section 62 is attached to tubular section as shown, circular passageway 36 extends continuously therethrough. Cone section 62 ends with a square bolt flange 70, preferably of a ½"×10"×10" configuration.

Figure 7:
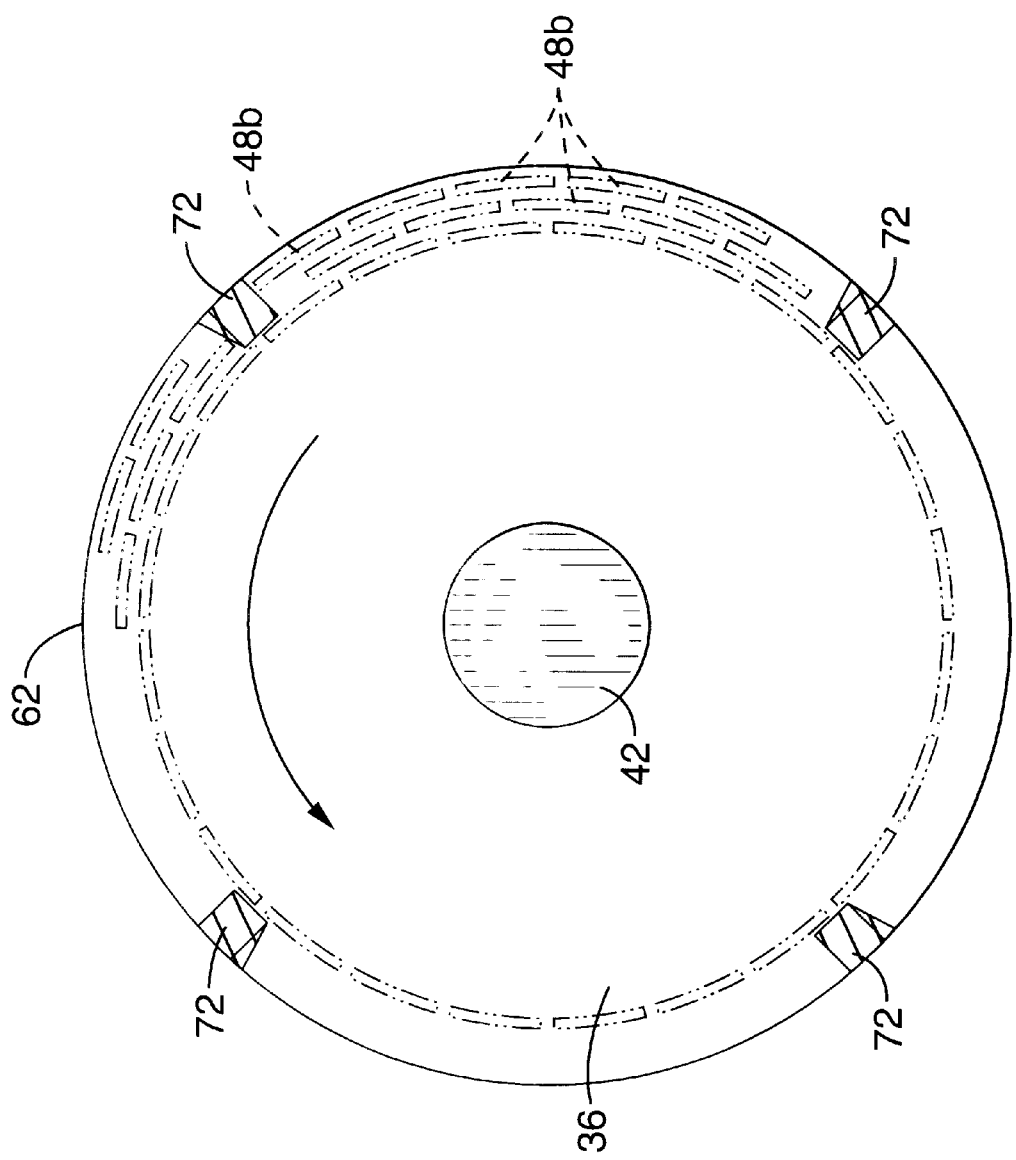
FIG. 7 is a longitudinal view of the conical section from the outlet end.

Circular passageway 36 formed within tubular section 60 and cone section 62 incorporates rifling 72 longitudinally disposed therein, which comprises a rail of four ¼"×¼" keyway material positioned at 60°, 120°, 240° and 300°, respectively, within circular passageway 36 and cone 62. Rifling 72 within circular passageway 36 and cone 62 extends generally straight throughout circular passageway. Rifling 72 keeps waxed corrugated cardboard segments 48a moving forward and disposing segments 48a horizontally as seen in FIG. 7, thereby controlling the friction and heat generated between circular passageway 36 and waxed corrugated cardboard segments 48a. Bleed holes (not shown) can be incorporated along circular passageway 36 to provide a means for introducing scented oils and colors during operation of conveyor compression screw 28.

Figure 6:
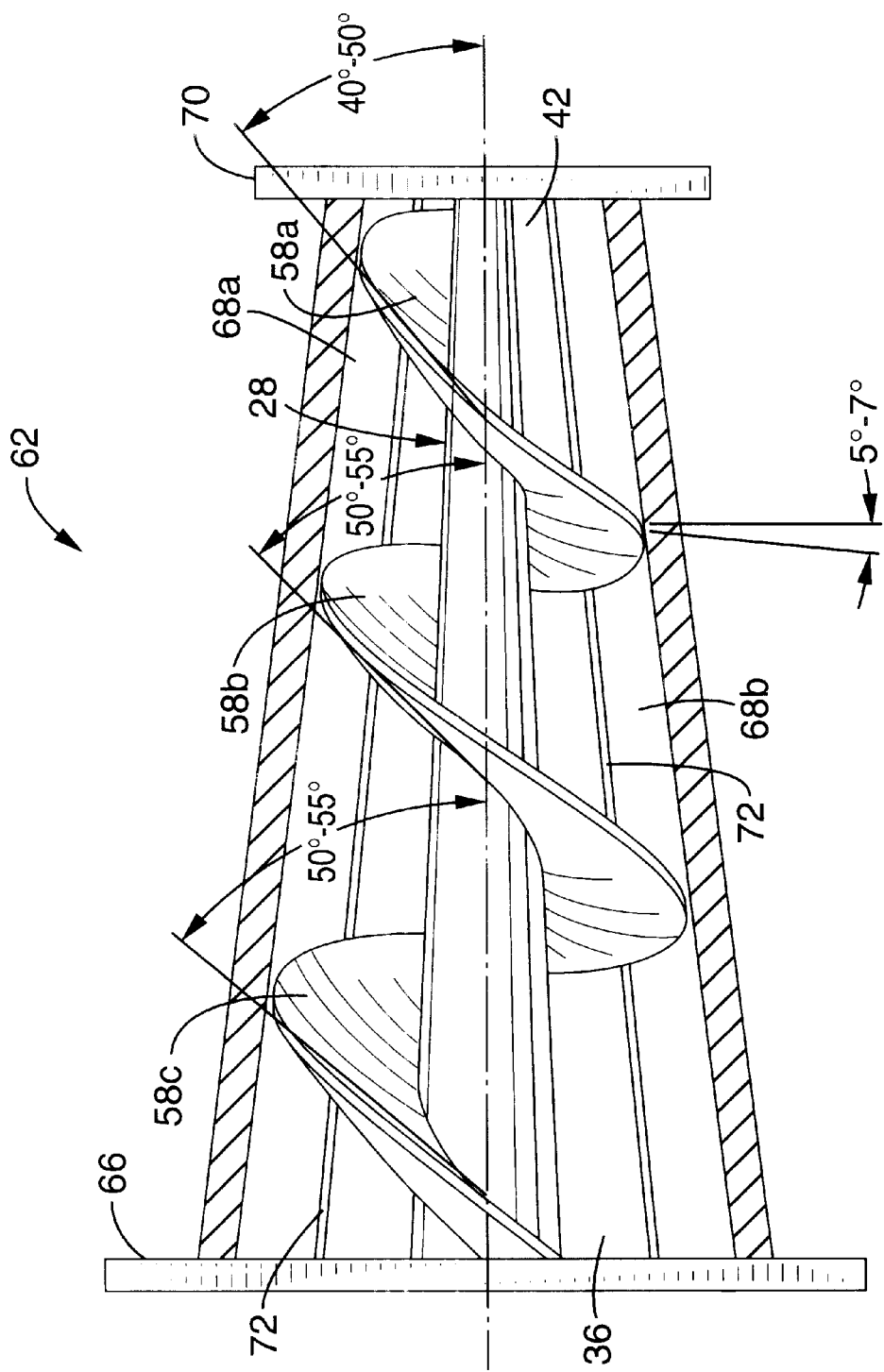
FIG. 6 is a detailed view of the conical section of the conveyor compression auger assembly of the present invention.

As can be seen in FIG. 6, flights 58a and 58b are cupped forward towards log die 20 at approximately 5°–7°, from the vertical, to more effectively push materials therethrough. Flights 58a–58c are angled or bent forward towards log die 20 at approximately 40°–55° from the longitudinal axis of conveyor screw 28, while flight 58a is angled or bent forward over the last 2 inches at approximately 45°. There is about a ¼" clearance between the outer circumferential edges of flights 58a, 58b, 58c, and the conical section 62, as seen in FIG. 7, allowing compressed circumferentially-disposed cardboard segments 48b towards the surfaces of conical section 62 and log die 20, thereby increasing ignition and burn efficiency on the outer surfaces of firelog 90 and resulting in a higher flame and appearance of a genuine bark firelog burning. Because cardboard segments 48b are compressed circumferentially around firelog 90, they open or expand with heat when burned, and the corrugations channel oxygen throughout segments 48a of firelog 90. Cardboard segments 48b are more tightly twisted in the center of firelog 90, increasing its burn time.

Figure 9:
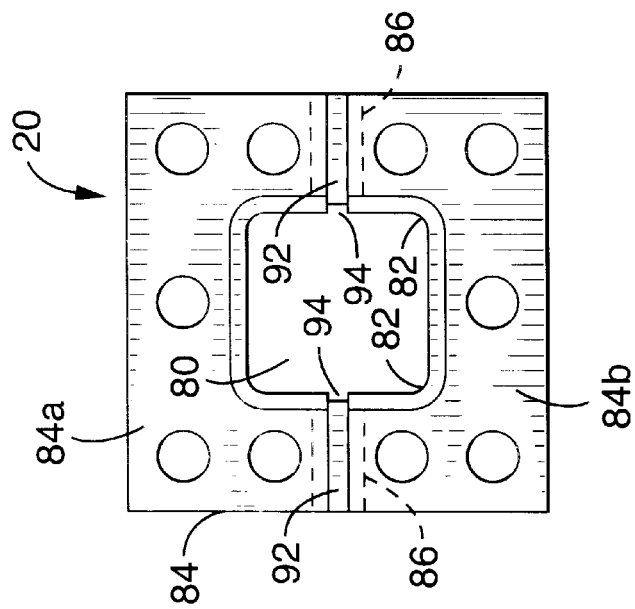
FIG. 9 is a frontal view of the firelog die shown in FIG. 4.
Figure 8:
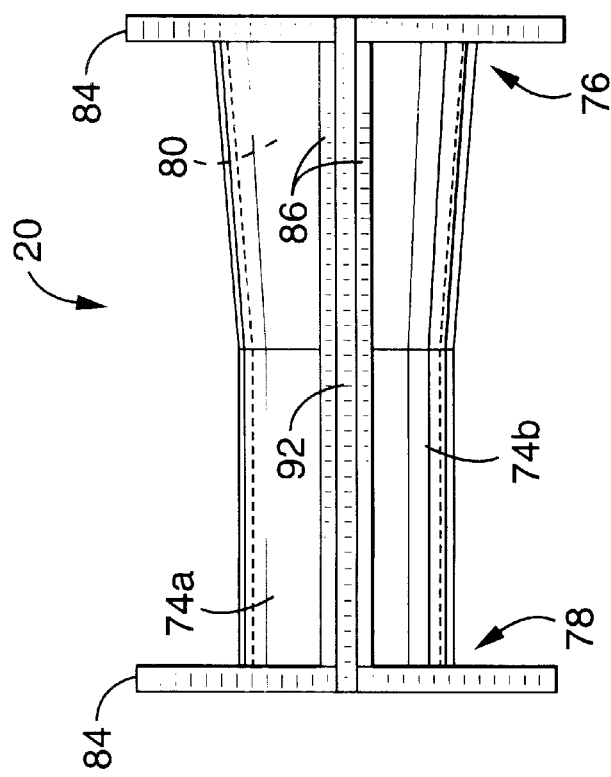
FIG. 8 is a side elevation view of the firelog die shown in FIG. 4.
Figure 11:
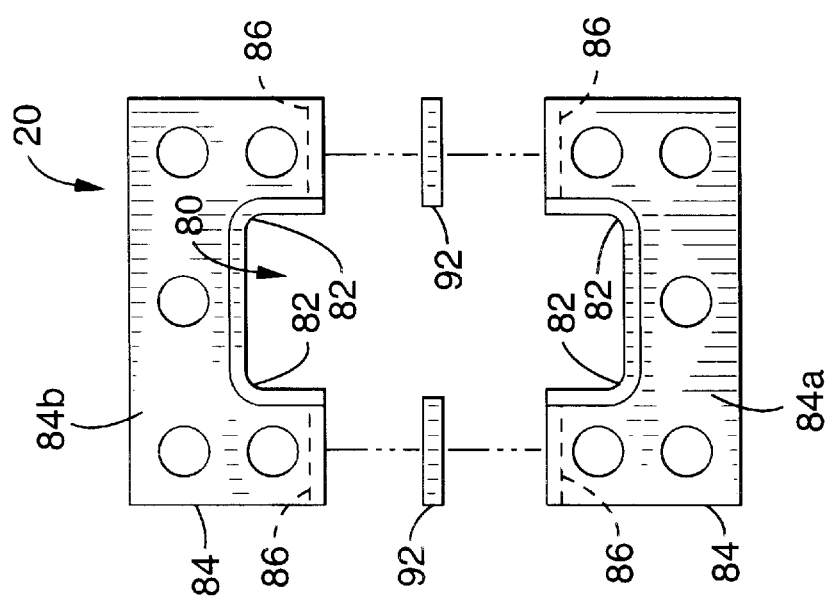
FIG. 11 is an exploded view of the firelog die shown in FIG. 9.
Figure 10:
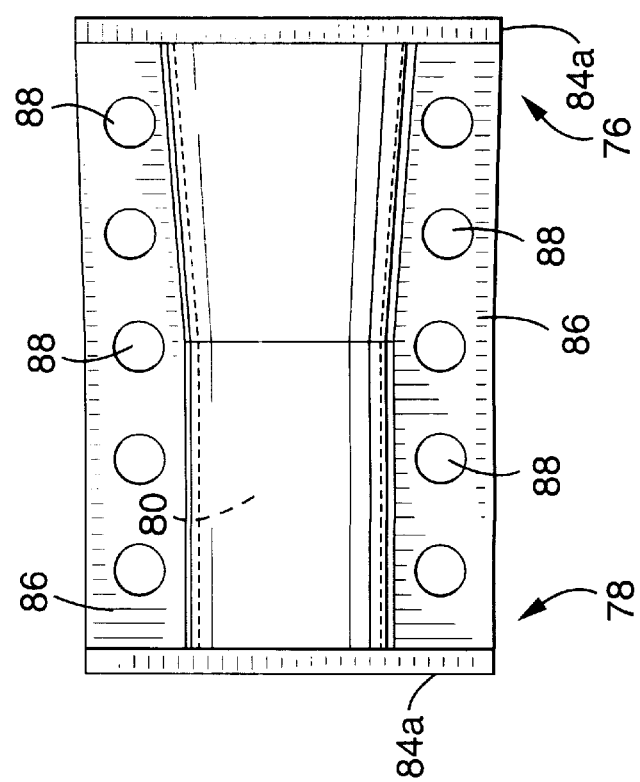
FIG. 10 is a top plan view of the firelog die shown in FIG. 4.

Referring also to FIG. 8 through FIG. 11, log die 20 of the present invention is generally shown. Log die 20 comprises a top section 74a, a bottom section 74b, an inlet end 76 and an outlet end 78. Log die 20 is approximately 12-inches in length with an inner opening 80 of approximately 4-square inches at inlet end 76 tapering to approximately 3½ square inches midway through log die 20. Inner opening remains at a constant 3½ square inches through to outlet end 78. Each corner 82 of opening 80 at outlet end 78 is radiused approximately 1-inch. A ½"×10"×10" square bolt flange 84a, 84b are disposed at inlet and outlet ends, respectively, when top section 74a and bottom section 74b are coupled together as shown in FIG. 8 and FIG. 9. Side flanges 86, typically having dimensions ¼"×2"×12", are added longitudinally to each side of top section 74a and bottom section 74b of log die 20. Side flanges 86 mate together and coupling means (not shown), are inserted through holes 88 to couple top section 74a and bottom section 74b, together and defining inner opening 80 that forms and shapes the artificial firelog 90. A pair of spacers 92 are placed between side flanges 86 of log die 20 to create a groove 94 on each side of inner opening 80. Grooves 94 cause a corresponding rail 96 to be formed on each firelog 90 about 180° apart. Groove 94 has a cross-section between approximately ⅛ to ¼ inches in both height and/or width. It is also contemplated that a single groove can be formed using only one spacer 92 between one pair of side flanges 86, however, the pair of flange on the opposite side of log die 20 must be thickened to accommodate the inclusion of spacer 92. It is further contemplated that firelog 90 can be formed without rails 96 by either the elimination of spacers 92 from between side flanges 86 or by widening spacers 92 such that inner opening 80 of log die 20 has flush surfaces. It is still further contemplated that firelog 90 can also be formed with grooves (not shown) by widening spacers 92 so that inner opening 80 of log die 20 has at least one protrusion. Firelog can also be formed with a combination rail 96 disposed on one side and a groove on the other side.

Figure 12:
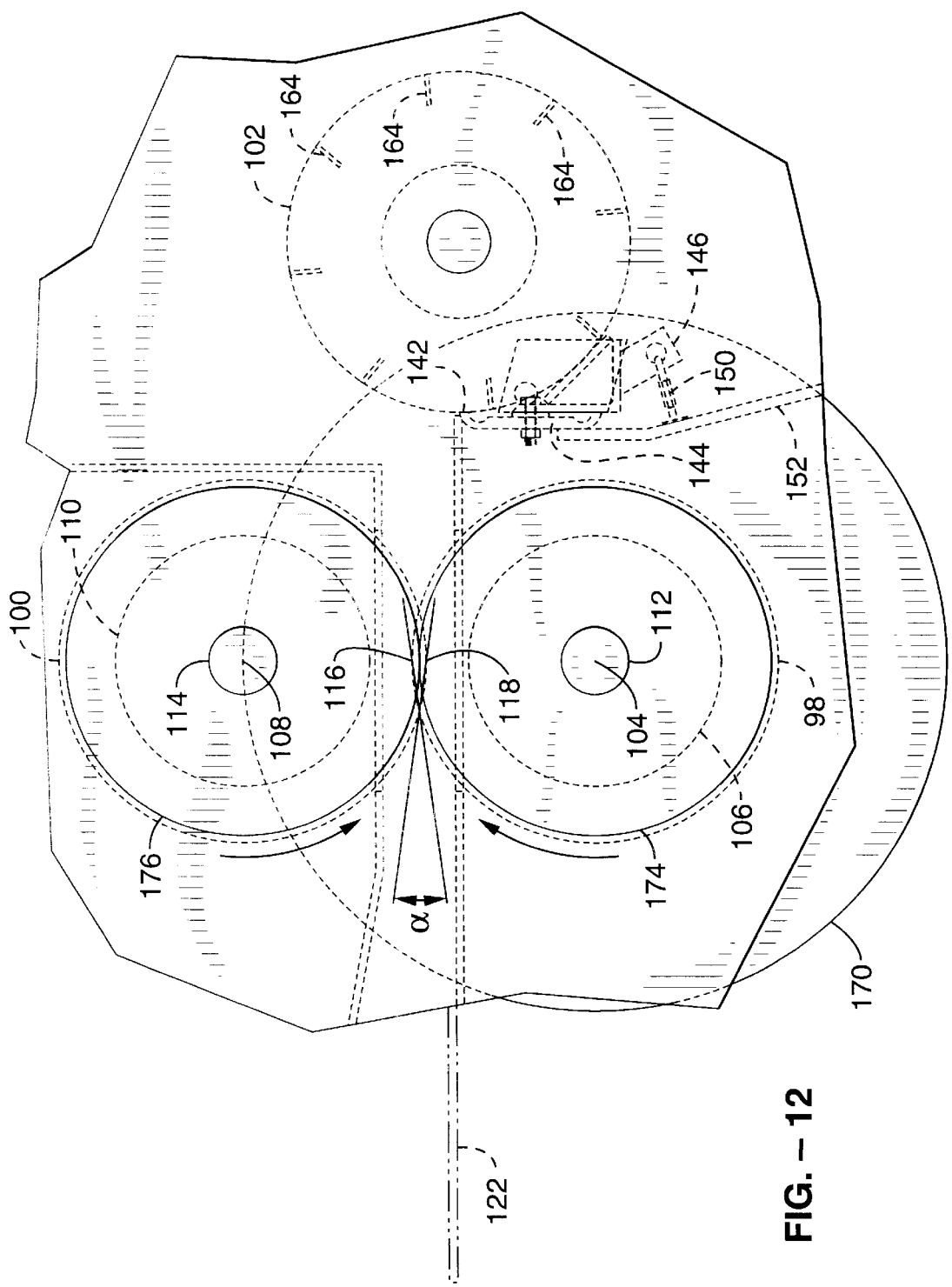
FIG. 12 is a right side view of the cutting assembly of the present invention.
Figure 13:
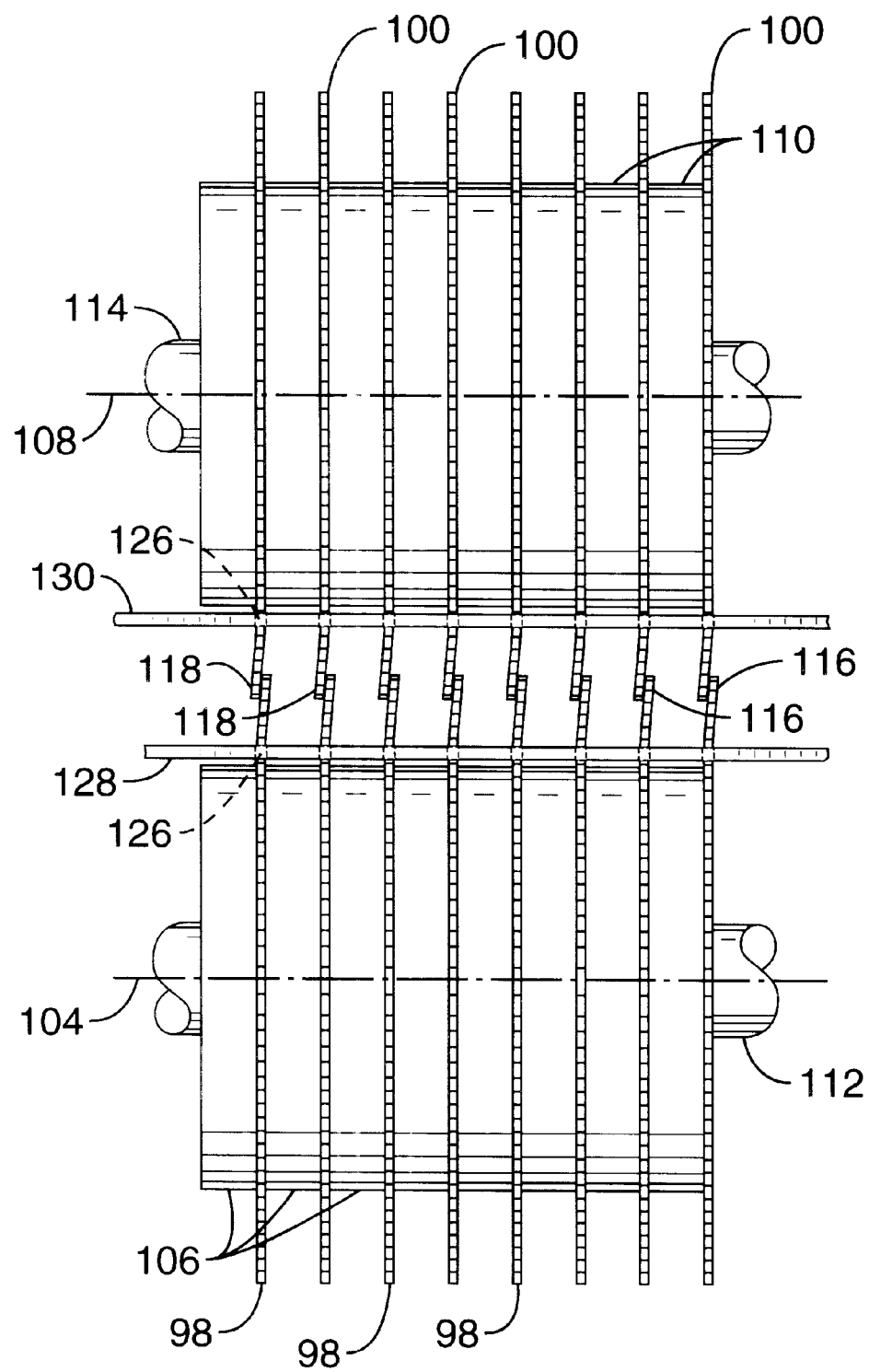
FIG. 13 is a front view showing the relationship between the upper and lower circular blades, along with the upper and lower guide plates.
Figure 14:
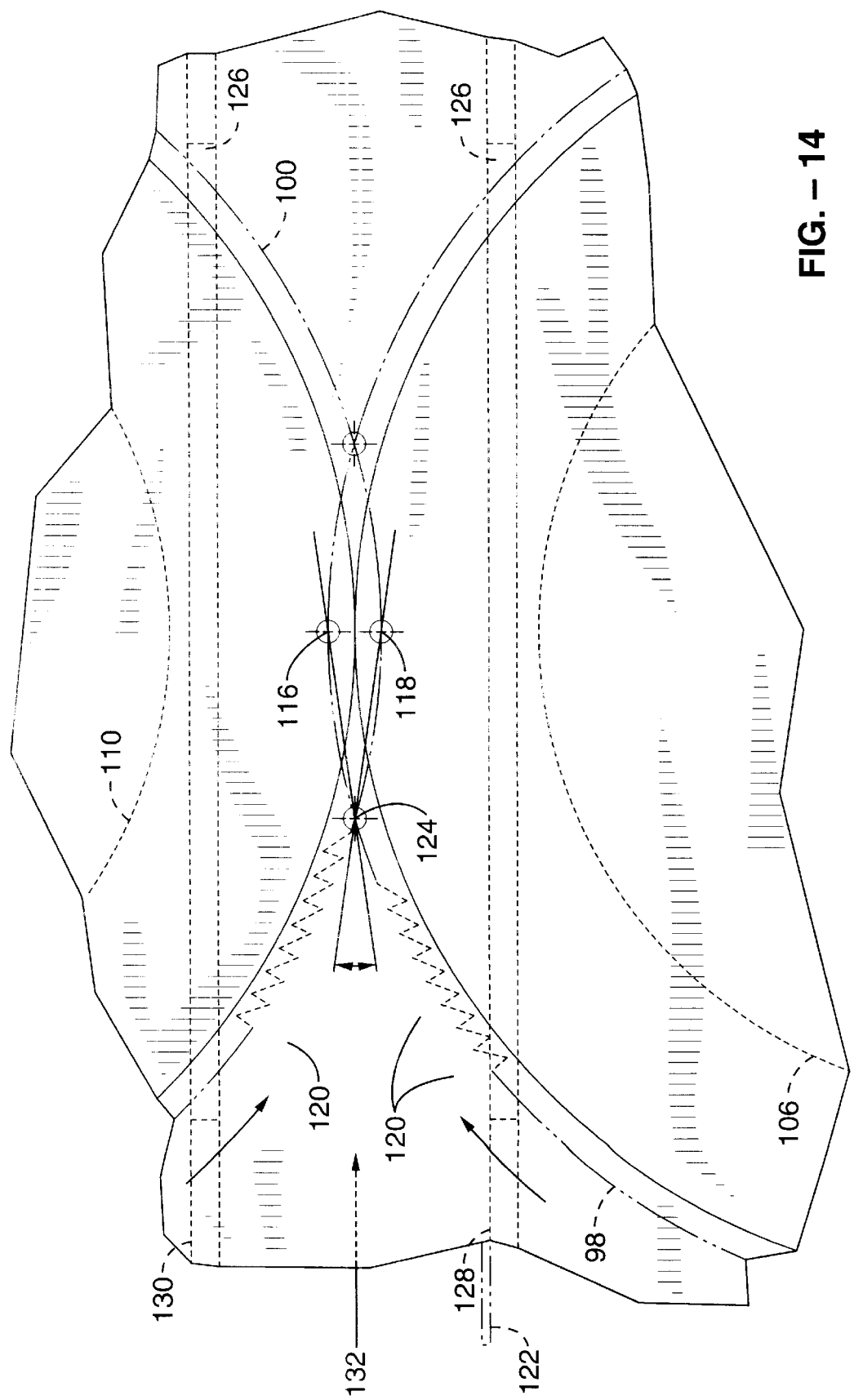
FIG. 14 is a side view of an upper and lower circular blade.

Referring now to FIG. 12 through FIG. 14, cardboard sheet cutting assembly 12 comprises a plurality of lower circular blades 98, a plurality of upper circular blades 100 and a cutting reel 102. Lower circular blades 98 are juxtaposed along a lower axis 104 and are separated by spacers 106 which maintain a constant distance between each lower circular blade 98. Upper circular blades 100 are juxtaposed along an upper axis 108 and are also separated by spacers 110. Lower axis 104 comprises a lower shaft 112 while upper axis 108 comprises an upper shaft 114. Both lower shaft 112 and upper shaft 114 are parallel and spaced apart such that the cutting edges 116 of lower circular blades 98 partially overlap the cutting edges 118 of upper circular blades 100, as clearly depicted in FIG. 13 and FIG. 14. Lower and upper shafts 112, 114, respectively, are at least about 1½ inches in diameter to fit into correspondingly sized bores in lower and upper circular blades 98, 100. A range of 40 to 50 blades are typically used per axis. Upper shaft 114 is approximately 50⅛ inches in length with a full length standard keyway (not shown) and has 2-inches of threads starting from its left end. A collar (not shown) welded thereon allows for axially adjusting upper shaft 114 to allow for some compression between lower and upper circular blades 98, 100. Lower shaft 112 is approximately 56 inches long and includes a full length standard keyway (not shown) and 2-inches of threads at each end. Lower and upper shafts 112, 114 are fabricated from mild steel, case hardened steel or like material.

Lower and upper circular blades 98, 100 can range between approximately 7¼ inches to 12-inches in diameter, but preferably, 8-inch non-fluted hollow ground blades are used, because their cutting edges 116, 118 have non-fluted (straight) teeth 120 which are necessary for grabbing and slicing the waxed cardboard sheets 122 or even waxed cardboard boxes. With an 8-inch circular blade, the overlap between cutting edges 116, 118 must be at least ¼-inches. Teeth 120 are angled in such a manner to draw or pull cardboard sheet 122. Circular blades 98, 100 must be case hardened to a Rockwell hardness of 45 or greater, and thick enough not to flex apart, but at least approximately 0.080 inches in thickness. Lower and upper spacers 106, 110 have a diameter of approximately 4½ inches to 5-inches when used with an 8-inch cutting blade since a minimum separation of 2½ inches must be maintained between cutting edges 116 of lower circular blade 98 and lower spacers 106 and also between cutting edges 118 of upper circular blades 118 and upper spacers 110. The included angle α between the points 124, where the lower circular blades 98 and upper circular blades 100 intersect must be no greater than 30° to ensure proper and reliable feeding of waxed corrugated cardboard sheets 122 into cutting assembly 12. The included angle α is determined by the angle between a tangent to upper circular blade 100 at the first intersecting point 124a with lower circular blade 98 and a tangent to lower circular blade 98 at the same intersecting point 124 with upper blade 100.

Figure 15:
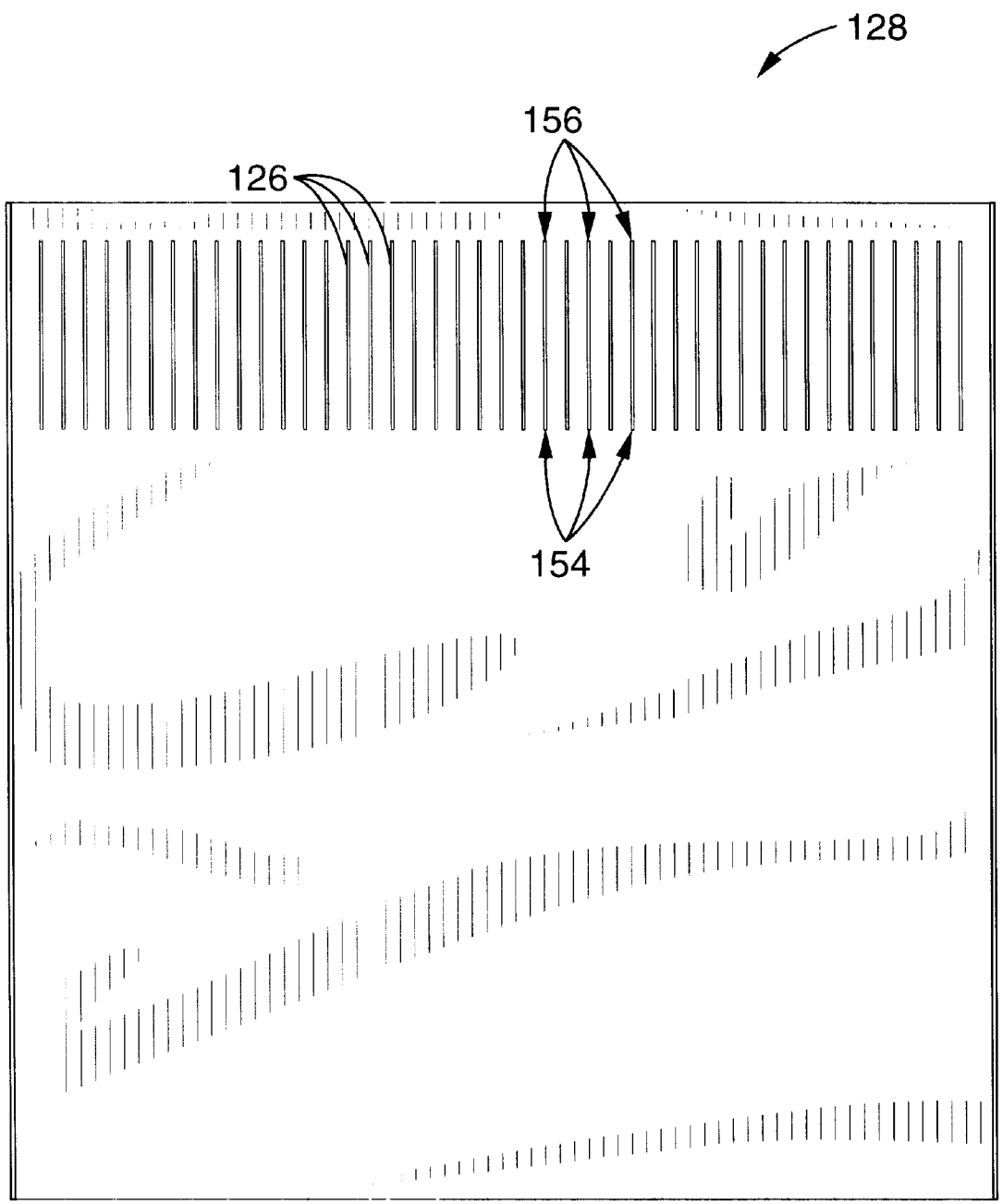
FIG. 15 is a top plan view of the lower guide plate shown in FIG. 12.
Figure 16:
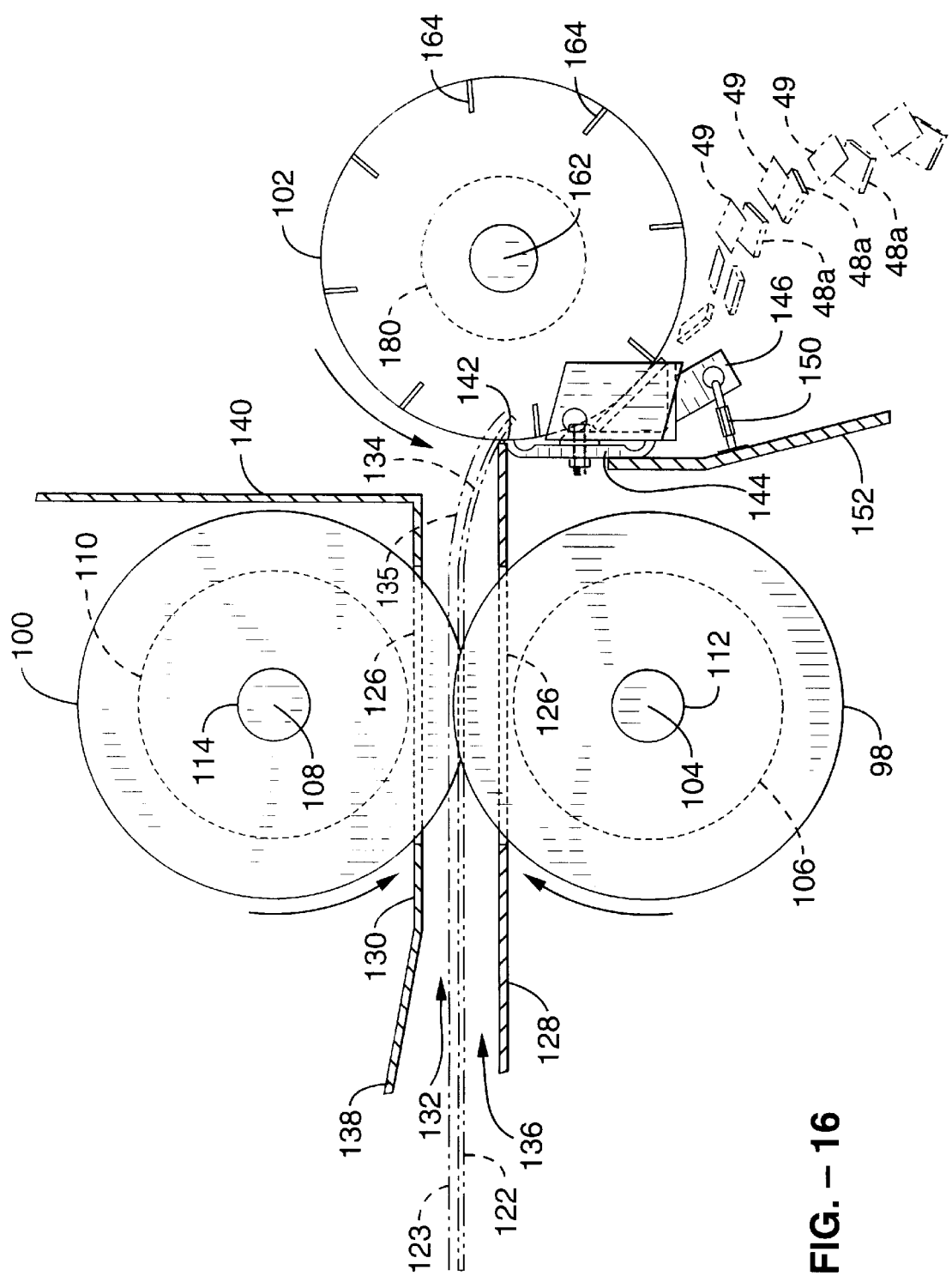
FIG. 16 is a right side view of the cutting assembly along with a waxed cardboard sheet, paper sheet, waxed cardboard segments and paper segments.
Figure 17:
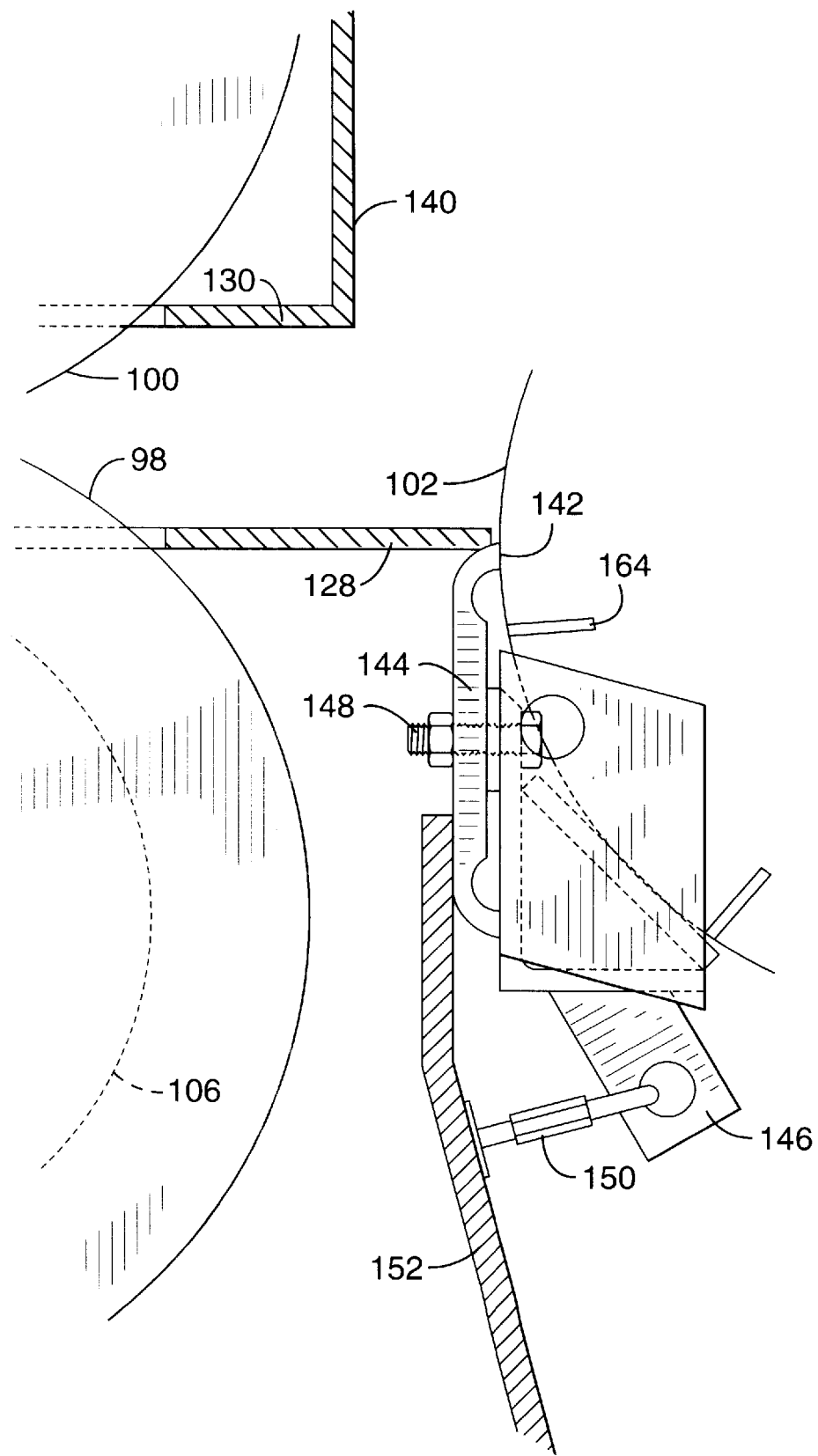
FIG. 17 is a side elevation view of a bed bar assembly of the present invention.
Figure 18:
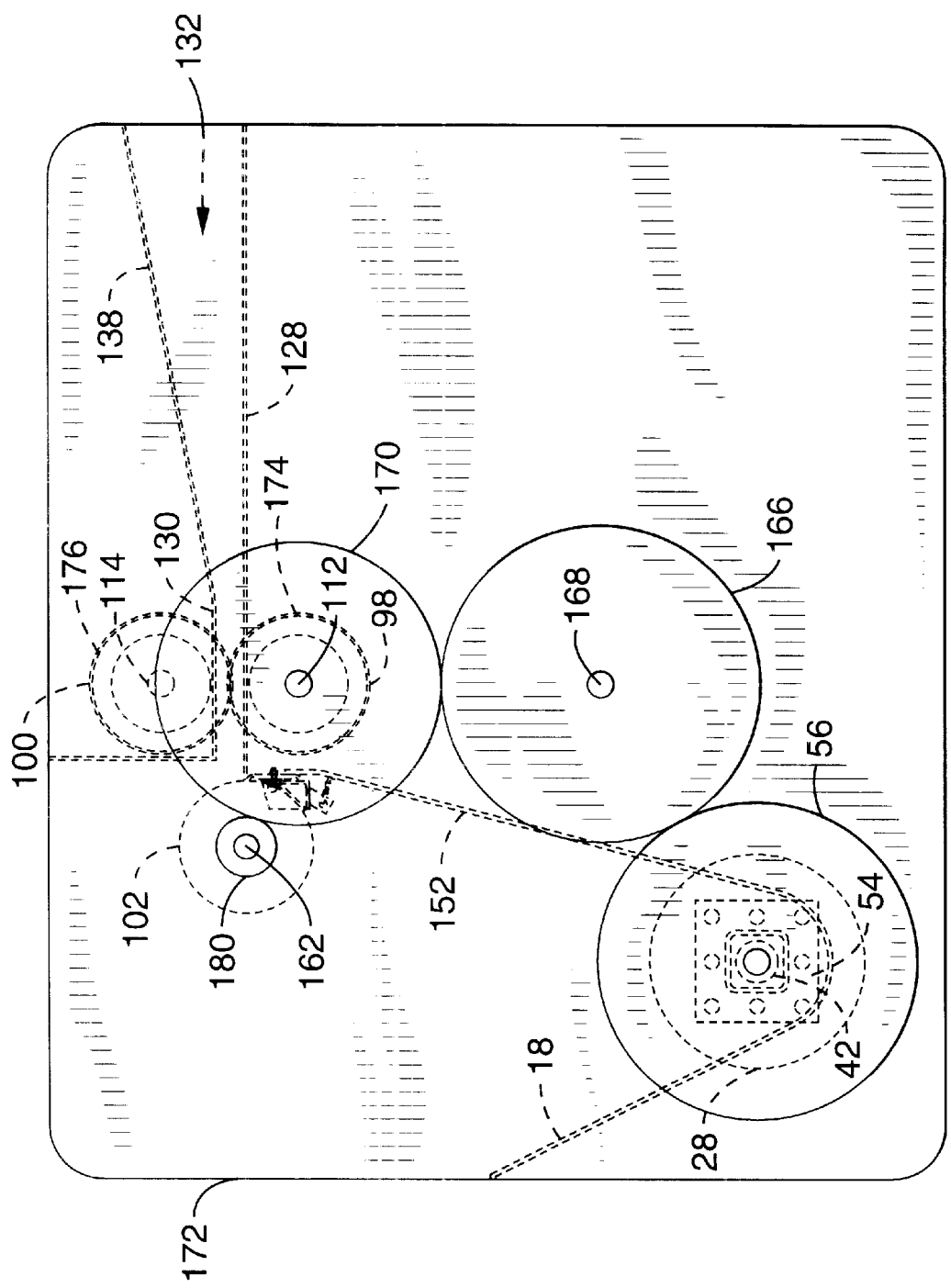
FIG. 18 is a left side view of the apparatus shown in FIG. 1.
Figure 19:
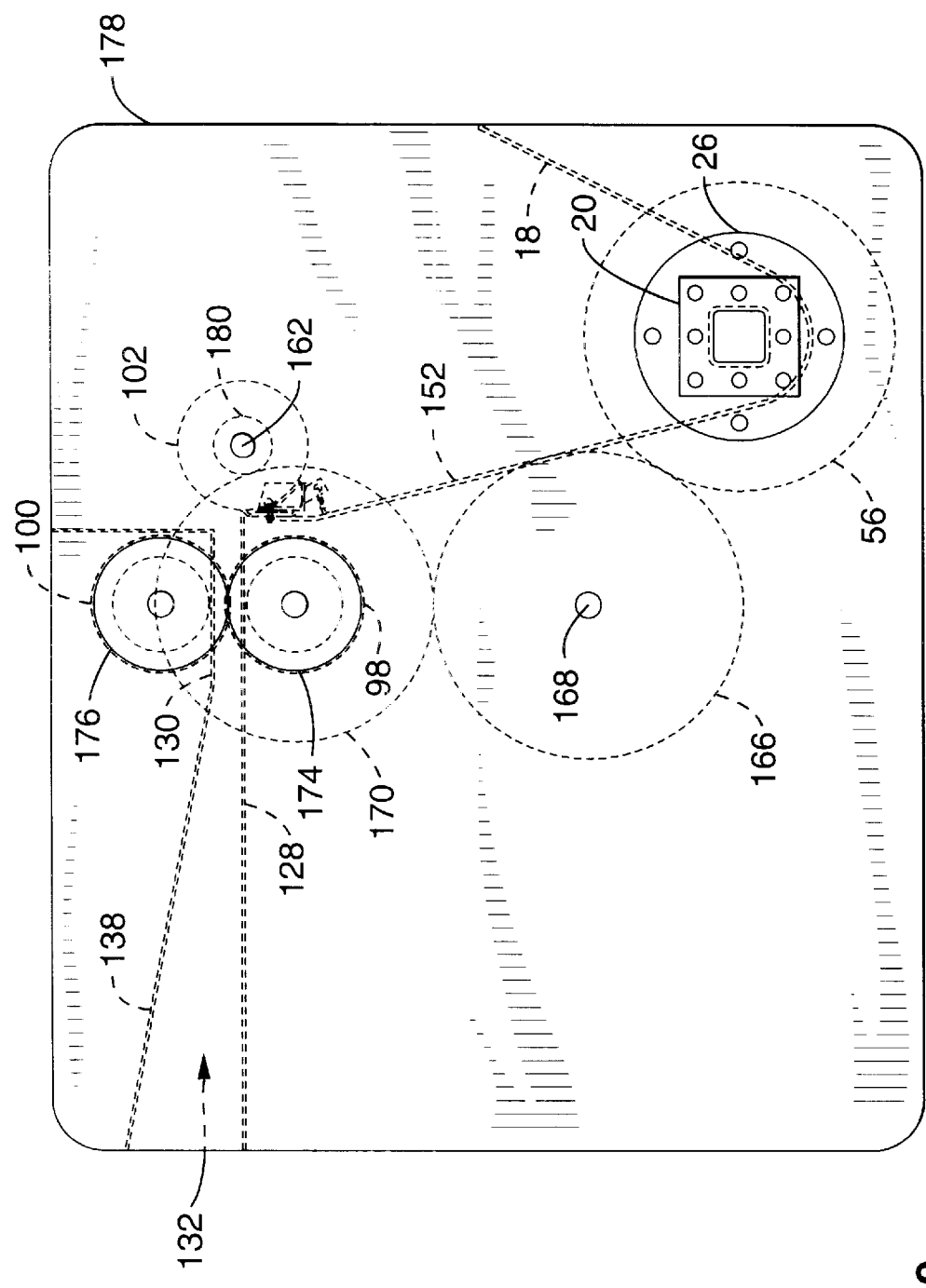
FIG. 19 is a right side view of the apparatus shown in FIG. 1.
Figure 20:
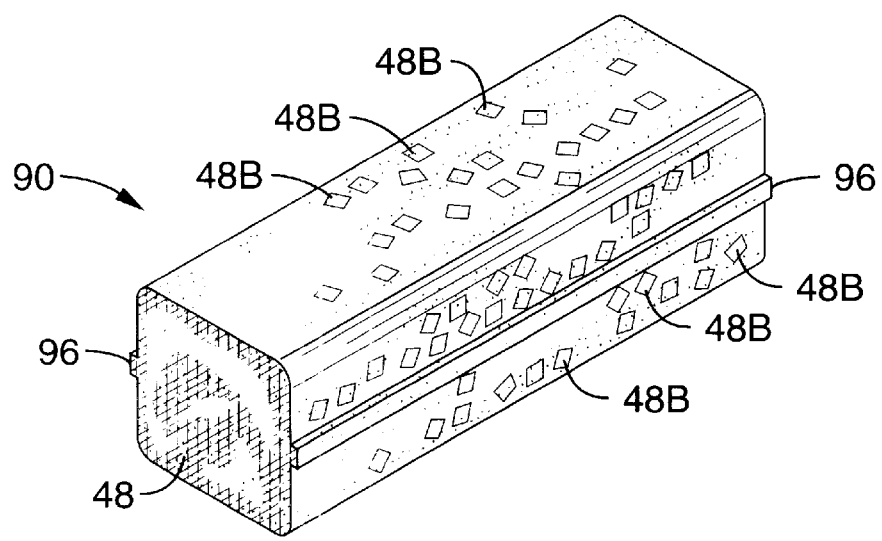
FIG. 20 is a perspective view of the artificial firelog apparatus manufactured by the apparatus shown in FIG. 1.
Figure 21:
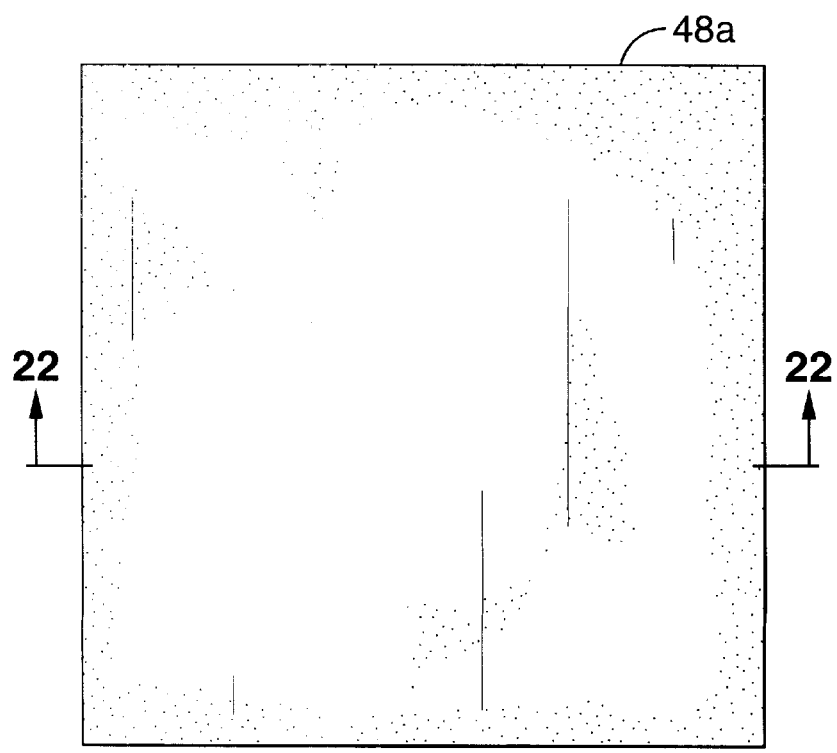
FIG. 21 is a top plan view of a waxed corrugated cardboard segment which forms a firelog shown in FIG. 20.

Referring also to FIG. 15 through FIG. 17 a plurality of slots 126 in lower and upper guides plates 128, 130 allow for cutting edges 116 of lower circular blades 98 and cutting edges 118 of upper circular blades 110 to extend therethrough, respectively. Lower and upper guide plates 128, 130 reside planarly between lower and upper circular blades 98, 100 and are generally parallel to each other, forming a defined path or channel 132 through which waxed corrugated cardboard sheets 122 can enter cutting assembly 12 and through which sliced waxed corrugated cardboard strips 134 pass. Upper guide plate 130 is angled upwards near the entry point 136 to channel 132 forming an upper guide 138 that facilitates feeding waxed cardboard sheets 122 into channel 132. Slots 126 are typically no greater than ¼ inches wide to help prevent lower and upper circular blades 98, 100 from clogging. A vertical guide plate 140 extends upwardly from upper guide plate 130 proximate to cutting reel 102 for separating waxed cardboard strips 134 just prior to contact with cutting reel 102 to prevent reverse flow of material. Lower guide plate 128 terminates at the inner edge directly above the cutting surface 142 of a bed bar knife 144 as seen in FIG. 16 and FIG. 17. A bed plate 146 disposed below bed bar knife 144 directs waxed corrugated cardboard segments 48a towards opening 34 in conveyor compression auger assembly 16. Attachment means 148, such as a nut and bolt, are used to attach bed bar knife 144 onto bed plate 146. The pitch angle of bed plate 146 is adjustable through a turnbuckle 150 attached between an inner hopper wall 152 and bed plate 146. Lower and upper circular blades 98, 100 are self-cleaning due to their minimal clearances within slots 126 in upper and lower guides plates 128, 130, respectively, as the leading edges 154 and the trailing edges 156 of slots 126 extend only approximately 0.010 inches beyond where circular blades 98, 100 passes through its corresponding slot 126.

As can be seen in FIG. 3, cutting reel 102 generally comprises a first and a second end panel 158, 160, an axial shaft 162 and a plurality of cutting blades 164. First and second panels 158, 160 are attached axially to each end of axial shaft 162. There are three inner support panels (not shown) that are spaced evenly between first and second end panels 158, 160. Cutting blades 164 are positioned circumferentially between first and second end panels 158, 160 and are generally parallel to axial shaft 162 whereby rotation of axial shaft 162 causes cutting blades 164 to revolve around axial shaft 162. Cutting reel 102 must have a diameter of at least approximately 8-inches, and axial shaft 162 must have a diameter of at least approximately 1½ inches. Axial shaft 162 is typically 49-inches in length, with 2-inch threads, a 6-inch standard key and is fabricated from mild steel, case hardened steel or like material. Cutting reel 102 preferably uses 8 cutting blades 164 that are equally spaced apart, each having a length of approximately 36-inches. First and second end panels 158, 160 and the three inner support panels have slots (not shown) to provide access for cutting blades 164 to be longitudinally inserted therethrough.

As cutting blades 164 revolve, each blade passes in close proximity to cutting surface 142 of bed bar knife 144, which results in a shearing of cardboard strips 134 passing therethrough into cardboard segments 48a, as depicted in FIG. 16. To facilitate cutting and aid in the migration of cardboard segments 48a into opening 34 of compression auger conveyor assembly 16, cutting blades 164 are helically configured. In the preferred configuration, cutting blades 164 have a left hand helix while cutting reel 102 rotates counterclockwise. With this preferred configuration, waxed corrugated cardboard segments 48a are "tossed" towards opening 34 of auger conveyor assembly Referring also to FIG. 18 and FIG. 19, the left side and right side, respectively, of apparatus 10 is generally shown. A motor (not shown), or like means, provides the power necessary to operate apparatus 10. Those skilled in the art will appreciate that the motor can be electrically powered, an internal combustion engine and/or be remotely located and coupled to apparatus 10 through a gear box (not shown). It has been determined, however, that the motor must provide an output of at least 40 horsepower in order to produce firelogs 90, while all the subassemblies are also simultaneously performing their functions.

In the preferred configuration, the motor directly drives an 18-inch primary spur gear 166 that is axially mounted on a primary driveshaft 168 which rotates within enclosure 14. Primary spur gear 166 in turn engages and drives a cutting assembly gear 170, which is a 16-inch spur gear. Cutting assembly gear 170 is axially mounted on lower shaft 112 of cutting assembly 12 adjacent the left side 172 of enclosure 14. Rotation of cutting assembly gear 170 rotates lower shaft 112 and hence, lower circular blades 98. A lower shaft spur gear 174 is axially mounted on lower shaft 112 adjacent the right side 178 of enclosure 14, as can be seen in FIG. 1 through FIG. 3. Lower shaft spur gear 174 engages and drives upper shaft spur gear 176, which is attached to upper shaft 114 adjacent the right end 178 of enclosure 14. Rotation of upper shaft spur gear 176 rotates upper shaft 114 and hence, rotates upper circular blades 100. Lower shaft spur gear 174 and upper shaft spur gear 176 are identically configured so that the rotational velocities of lower and upper circular blades 98, 100 are the same. In the preferred embodiment, lower shaft and upper shaft spur gears 174, 176, respectively, are approximately 8-inches in diameter.

Cutting reel 102 is driven by spur gear 170, which is driven by primary spur gear 166. Axial shaft 162 of cutting reel 102 includes a gear 180 adjacent the left side 172 which is driven by spur gear 170, which engages primary spur gear 166. In the preferred configuration, gear 180 of cutting reel 102 is a spur gear that is configured to provide a rotational velocity of approximately 4:1 between lower circular blades 98 and cutting reel 102. The 4:1 ratio between lower circular blades 98 and cutting reel 102 is critical as it determines the length and size of waxed cardboard segments 48a. The higher the ratio, the smaller waxed segments 48a and conversely, the lower the ratio, the larger the waxed segments 48a.

Primary spur gear 166 also drives shaft 42 of conveyor compression auger screw 28. Primary spur gear 166 engages conveyor compression auger screw spur gear 56, which is mounted on shaft 42 adjacent flange bearing 54, as shown in FIG. 1. Conveyor compression auger screw spur gear 56, preferably, is also approximately 18-inches in diameter to allow for the same rotational velocity in conveyor compression auger screw 28. Although gears mechanism are disclosed to drive cutting assembly 12 and conveyor compression auger assembly 16, those skilled in the art will appreciate that chain and sprocket assemblies (not shown), belt and pulley assemblies (not shown) and/or a combination of any of the aforementioned can be used to achieve the same objective.

Figure 22:
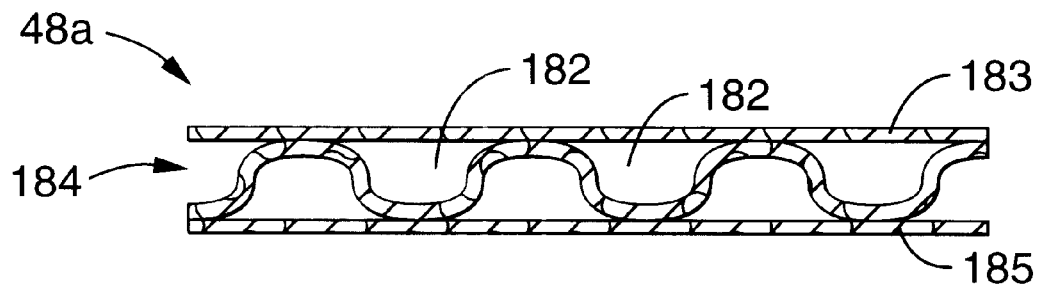
FIG. 22 is a cross sectional view of the waxed corrugated cardboard segment taken along line 22—22 in FIG. 21.
Figure 23:
FIG. 23 is a cross sectional view of the waxed corrugated cardboard segment compressed to a ratio approximately 8:1.

To fabricate artificial firelog 90, flattened waxed corrugated cardboard boxes in the form of cardboard sheets 122 are fed into channel or opening 132 until grasped by lower and upper circular blades 98, 100. Lower and upper circular blades 98, 100 draw or pull waxed corrugated cardboard sheets 122 into and through channel 132 while slicing waxed corrugated cardboard sheets 122 into strips 134. As waxed corrugated cardboard strips 134 pass through and exit channel 132, cutting blades 164 on cutting reel 102 chop waxed cardboard strips 134 into waxed cardboard segments 48a (as seen in FIG. 16) which then fall into hopper 18 and are guided into opening 34 of conveyor compression auger assembly 16. Waxed cardboard segments 48a produced by cutting assembly 12 are approximately ½ to 1 square inch in size with frayed edges on each of two opposing sides made by teeth 120 (as shown in FIG. 14) of lower and upper cutting blades 98, 100, with the wax coating remaining intact. This particular size of waxed cardboard segments 48a (as seen in FIG. 22 and FIG. 23), along with the frayed edges, enable compressed waxed cardboard segments 48b to light up quicker and also to maximize its overall burn efficiency. Foreign metallic substances, such as staples, commonly found with cardboard sheets 122 are effectively removed through use of magnetic means applied to the outer areas of hopper wall 152 which prevents such metallic substances from entering opening 34 and conveyor compression auger assembly 16. Segments 48a can also be directed at hopper wall 152 to a drying apparatus and then returned to hopper 18 before entering opening 34 and conveyor compression auger assembly 16.

To fabricate firestarter chips, paper sheets 123, preferably with 10%–25% paper, are laid over waxed cardboard sheets 122 and both are fed into opening 132 until grasped by lower and upper circular blades 98, 100. Lower and upper circular blades 98, 100 slice waxed cardboard sheets 122 and paper sheets 123 into waxed cardboard strips 134 and paper strips 135, respectively. Cutting blades 164 on cutting reel 102 chop waxed cardboard strips 134 and paper strips 135 into waxed cardboard segments 48a and paper mix 49, respectively. Waxed cardboard segments 48a and paper mix then fall into hopper 18 and are gathered or diverted to a standard bagging machine (not shown) for packaging waxed cardboard segments 48a and paper mix 49 as an aggregate firestarter mix composed of approximately 80% waxed cardboard segments 48a and approximately 10%–25% paper mix 49. Those skilled in the art will appreciate that approximately 20% of waxed cardboard segments 48a can be hammermilled into a cotton-like fiber which can be used in lieu of paper mix 49. This cotton-like fiber promotes rapid ignition in the firestarter only, but has the opposite effect when compressed into a firelog.

After waxed cardboard segments 48a enter opening 34, the rotation of conveyor compression screw 28 transports waxed cardboard segments 48a into and through housing 26. Conveyor compression screw 28 rotates and compresses waxed cardboard segments 48a within housing 26 and, as compressing waxed cardboard segments 48b approach outlet end 32 of housing 26, segments 48b are heated up due to the compression friction and centrifugal force occurring therein. This heating propagates uniformly and adheres segments 48b together in a generally interlocking planar fashion. This interlocking planar adhesion of segments 48b gives finished firelog 90 additional cohesive strength with no cold joints. Conveyor compression auger assembly 16, however, keeps the temperature of compressed waxed cardboard segments 48b under 150° F., which prevents the "wet glue", that is used to form the cardboard corrugations, from melting and delaminating the corrugations 182, as seen in FIG. 22 and FIG. 23. Also, the wax that is used on the cardboard segments 48a has a blocking point temperature of approximately 110° F. and a melting point temperature of approximately 142° F. The heat necessary to form firelog 90, without melting the wet glue and wax in the corrugated cardboard, is generated only by conveyor compression screw 28 and is typically about 50° F. to 55° F. above ambient temperature. Firelogs 90 are best formed approximately between 108° F. and 148° F., thus requiring an ambient temperature range of approximately 53° F. to 93° F., which is well within the range of most factories or manufacturing facilities. It has been determined that when the ambient temperature is lower, conveyor compression auger assembly 16 can be run faster and consequently, more firelogs 90 can be produced. Therefore, the ability to vary the ambient temperature of the manufacturing environment is desirable.

Structural integrity of corrugations 182 is essential to allow oxygen and wax to flow through for more efficient burning of firelog 90. The centrifugal force urges segments radially outward to the periphery of firelog 90 so as to lay segments 48b "flat" along the outer surface of firelog 90, as shown in FIG. 7, and thus, better resembling genuine wood bark (FIG. 20) as firelog 90 is burned. Waxed cardboard segments 48b are compressed to a factor of approximately 5 to 8 times by conveyor compression auger assembly 16. The heated and compressed waxed cardboard segments 48b are pushed through outlet end 32 of housing 26 and immediately into log die 20 where they are further compressed and shaped into firelogs 90. The finished firelog 90 exits through outlet 78 of log die 20. If necessary to cool conveyor housing 26, conventionally known methods can be applied, such as a combination of cooling fins on conical section 62 and/or tubular section 60 with fans blowing air onto said sections or water jackets disposed around said sections with liquid coolant flowing therethrough.

Because of the unique configuration of conveyor compression auger assembly 16, waxed cardboard segments 48b do not require additional wax or glue for firelog 90 to hold together. If desired, openings (not shown) can be placed in tubular section 60 and/or conical section 62 of conveyor compression auger assembly 16 so that liquid wax can be added to cardboard segments 48b. This would be necessary if non-waxed corrugated cardboard sheets are used. Grooves 94 in log die 20 form longitudinal rails 96 on firelog 90 that are approximately between ⅛ to ¼ inches in width and that extend approximately between ⅛ to ¼ inches above the surface of firelog 90. Rails 96 act like a wick to help in lighting firelog 90 at startup and also keeps the wrapper, if used, from sticking onto firelog 90 when lit. As firelog 90 burns, corrugations 182 on waxed cardboard segments 48c expand, allowing oxygen and wax to permeate throughout firelog 90, resulting in a clean and efficient burning firelog 90. The outermost segments of firelog 90 fall off and the next outermost layer continues burning.

An outer coating or cover (not shown) can be extruded along with firelog 90. The bleed holes in circular passageway 36 allow for plastic or hot glues to be inserted into housing 60 to form the outer coating or cover for firelog 90 during compression and extrusion. A means can also be provided wherein the plastic or hot glue is inserted beyond exit 76 of die 20. The outer coating or cover gives the log structure a significantly greater compressive strength, thereby allowing a log produce with the outer coating or cover to be used as a post, pillar or the like.

Referring now to FIG. 20 through FIG. 24, a firelog 90 manufactured by apparatus 10 of the present invention is generally shown. As will be seen, firelog 90 is a longitudinally-shaped structure that comprises corrugated cardboard segments 48b which have been densely compacted together. The basic material used to form firelog 90 is waxed corrugated cardboard sheets 122 taken from ordinary waxed cardboard boxes. The waxed corrugated cardboard sheet 122 is cut into small segments 48a, as shown and described above, preferably between ½ square inch to 1 square inch in size. It has been shown, however, that exceeding this preferred size would result in a loss of the decorative burn aspect of firelog 90. Alternatively, one can use waxed cardboard segments 48a smaller that the preferred range, but would result in a higher manufacturing cost and the creation of cold joints.

It is essential the waxed corrugated cardboard segments 48a used have a cellulose structure 184 which is intact as corrugations 182 of cellulose structure 184 allow air to flow through waxed corrugated cardboard segment 48b, resulting in an efficient and prolonged burn. Firestarter chips are identical to waxed cardboard segments 48a. Because waxed cardboard segments 48a are fabricated from waxed corrugated cardboard sheets 122, waxed cardboard segments 48a have a first substantially planar member 183 and a second substantially planar member 185 covering corrugations 182 of cellulose structure 184.

Waxed corrugated cardboard segment 48b is compressed to a ratio approximately between 5:1 and 8:1, resulting in a compressed waxed corrugated cardboard segment 48b as depicted in FIG. 23. The range between 5:1 and 8:1 has been determined to be the preferred compression ratio as compressing waxed corrugated cardboard segment 48b beyond this range would cause damage to the cellulose structure 182, thus effectively eliminating the effect of corrugations 182. After being compressed in conveyor compression auger assembly 16, waxed corrugated cardboard segments 48b are densely packed together during an extrusion process through log die 20 and then cut at evenly-spaced sections to form firelog 90 having generally cylindrical-shaped structure. Biomass can also be added in with waxed corrugated cardboard segments 48a during the compression process, including but not limited to saw dust, almond shells, walnut shells, peanut shells, olive pits, cherry pits, coal. The addition of such biomass provide firelog 90 with desired aromatic characteristics when firelogs 90 are burned. Biomass can also serve to increase or decrease the friction level within circular passageway 36 during compression of waxed corrugated cardboard segments 48a.

Figure 24:
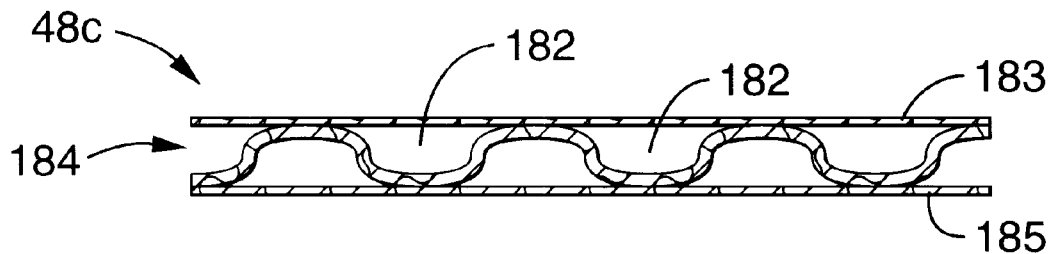
FIG. 24 is a cross sectional view of the waxed compressed corrugated cardboard segment as the cardboard gets heated.

FIG. 24 depicts the compressed waxed corrugated cardboard segments 48c as firelog 90 begins to burn. Corrugations 182 expand due to the heat, allowing air to efficiently flow throughout the structure of firelog 90.

Figure 25:
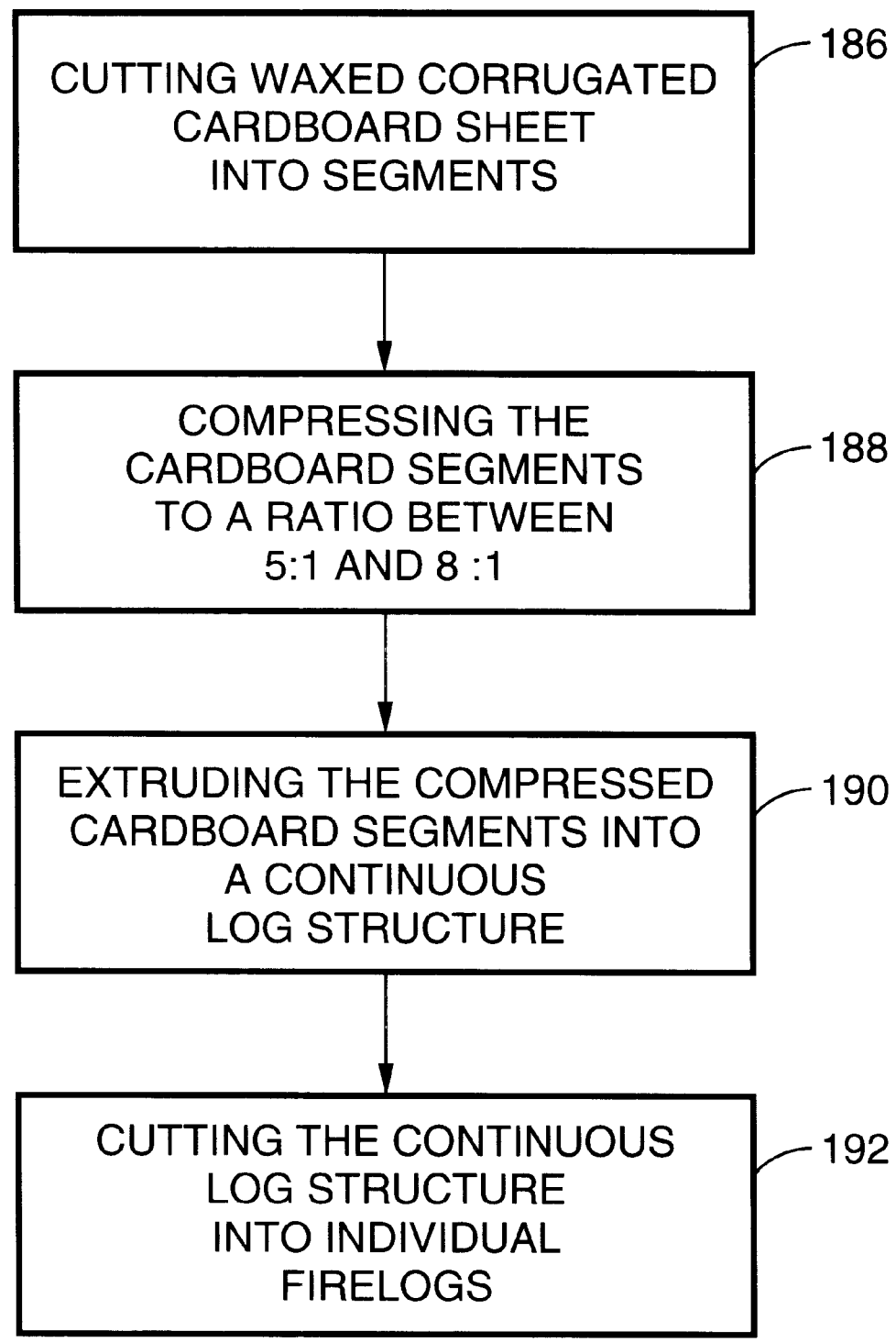
FIG. 25 is a flow diagram depicting the steps to fabricate the firelog shown in FIG. 20.

Referring finally to FIG. 25, a flow chart of the manufacturing process for firelog 90 is generally depicted. The first step 186 involves cutting waxed corrugated cardboard sheet 122 into segments 48a. The second step 188 involves compressing cardboard segments 48b to a ratio between 5:1 and 8:1. In the third step 190, cardboard segments 48b are extruded into a continuous log structure. The fourth and final step 192 involves cutting the continuous log structure into individual firelogs 90.

Accordingly, it will be seen that this invention converts standard pre-waxed corrugated cardboard sheets 122 into artificial firelogs 90 by slicing the waxed cardboard sheets into strips 134, cutting waxed cardboard strips 134 into waxed cardboard segments 48a and heating and compressing waxed cardboard segments 48b to form an artificial firelog 90. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method for manufacturing firestarter chips, comprising the steps of:

(a) providing a waxed corrugated cardboard cutting assembly having a plurality of lower circular blades, a plurality of upper circular blades, said plurality of lower and upper circular blades configured to slice the cardboard sheet placed therebetween into cardboard strips, a cutting reel positioned to receive the cardboard strips, said cutting reel capable of cutting the cardboard strips into cardboard segments;

(b) slicing a waxed corrugated cardboard sheet into cardboard strips;

(c) slicing at least one sheet of paper into paper strips simultaneously with said slicing of said waxed corrugated cardboard sheet;

(d) chopping said cardboard strips and said paper strips into waxed corrugated cardboard segments and paper segments, respectively; and (e) forming a firestarter chip from said cardboard and paper segments by adhering said segments to each other.

2. A method for manufacturing firestarter chips as recited in claim 1, said forming step further comprising the steps of:

(a) gathering said waxed corrugated cardboard segments and said paper segments;

(b) aggregating the waxed corrugated cardboard segments and the paper segments in a ratio greater than 1:1; and (c) packaging said aggregation of waxed corrugated cardboard segments and said paper segments.

* * * * *